(12) United States Patent
Wen et al.

(10) Patent No.: US 8,509,153 B2
(45) Date of Patent: Aug. 13, 2013

(54) METHOD AND APPARATUS FOR FORWARDING PACKETS IN IPV6 ACCESS CODE

(75) Inventors: Haibo Wen, Shanghai (CN); Gang Liu, Shanghai (CN)

(73) Assignee: Alcatel Lucent, Paris (FR)

( * ) Notice: Subject to any disclaimer, the term of this patent is extended or adjusted under 35 U.S.C. 154(b) by 272 days.

(21) Appl. No.: 13/002,729

(22) PCT Filed: Aug. 26, 2008

(86) PCT No.: PCT/CN2008/001529
§ 371 (c)(1),
(2), (4) Date: Jan. 5, 2011

(87) PCT Pub. No.: WO2010/022535
PCT Pub. Date: Mar. 4, 2010

(65) Prior Publication Data
US 2011/0134922 A1  Jun. 9, 2011

(51) Int. Cl.
*H04Q 7/00* (2006.01)
*H04L 12/28* (2006.01)

(52) U.S. Cl.
USPC .......................................... 370/328; 370/392

(58) Field of Classification Search
USPC ................. 370/254, 255, 328, 338, 392, 401
See application file for complete search history.

(56) References Cited

U.S. PATENT DOCUMENTS

| | | | |
|---|---|---|---|
| 7,266,090 B2 * | 9/2007 | Sawada et al. | 370/254 |
| 7,330,486 B2 * | 2/2008 | Ko et al. | 370/475 |
| 7,801,070 B2 * | 9/2010 | Omae et al. | 370/315 |
| 2004/0111529 A1 * | 6/2004 | Parmar | 709/245 |
| 2004/0240468 A1 | 12/2004 | Chin et al. | |
| 2005/0128943 A1 * | 6/2005 | Gibbs et al. | 370/229 |
| 2005/0286553 A1 * | 12/2005 | Wetterwald et al. | 370/466 |
| 2008/0189415 A1 | 8/2008 | Vaswani et al. | |
| 2010/0008507 A1 * | 1/2010 | Galante et al. | 380/278 |

FOREIGN PATENT DOCUMENTS

| | | |
|---|---|---|
| CN | 1921394 A | 2/2007 |
| CN | 101043614 A | 9/2007 |
| WO | WO-2008097446 A1 | 8/2008 |

OTHER PUBLICATIONS

International Search Report.

* cited by examiner

*Primary Examiner* — Hong Cho
(74) *Attorney, Agent, or Firm* — Harness, Dickey & Pierce

(57) ABSTRACT

In view of the technical problems that exist during implementing IP address anti-spoofing in an access node device in an IPv6 access network, the present invention proposes a packet forwarding method and apparatus in an IPv6 Access Node, for forwarding a packet from a Residential Gateway. In the method, the access node device first receives a packet from the Residential Gateway, then obtains a network prefix in a source UPv6 address of the packet, judges whether the network prefix in the source IPv6 address of the packet is a valid network prefix of a CPN corresponding to the Residential Gateway, and if yes, forwards the packet finally. Particularly, in the present invention the access node device can automatically obtain valid network prefix using technical means such as snooping a network prefix allocation reply message. Therefore, the present invention greatly increases operation efficiency and security of the IPv6 access network and simplifies network management of the IPv6 access network.

13 Claims, 4 Drawing Sheets

METHOD AND APPARATUS FOR FORWARDING PACKETS IN IPV6 ACCESS CODE

TECHNICAL FIELD

The present invention relates to an access node device in an access network under an IPv6 environment, and more specifically, to a method and apparatus for forwarding packets in an access node device in an IPv6 access network.

DESCRIPTION OF THE RELATED ART

With the network evolution, the depletion of IPv4 addresses, and also more and more devices in the Customer Premises Network (CPN), such as the Home User network and the Enterprise Network, requiring to be Internet-enabled, an access network is beginning to its transition to support IPv6. The Broadband Forum has been working on standardization for evolving a Digital Subscriber Line (DSL) access network to be IPv6-enabled.

An Access Node (AN) is the first absolutely controlled device of an operator in the access network. Hence, checking validity of packets and removing invalid packets in the Access Node is of vital importance to network security of the operator. In an IPv4 access network, network security measures such as IP address anti-spoofing are implemented on the AN to secure the network and also avoid service theft. However, it is rather difficult to implement IP address anti-spoofing in an IPv6 environment in the same way as in IPv4. Reasons are presented below.

1) As more and more devices are connected via the CPN to the AN of the operator, much more records for IP address anti-spoofing must be added to the AN, which will require the AN to have a high storage capacity and strong operation performance and further greatly increase the construction cost of access node devices in the IPv6 access network.

2) Many User Terminals in the IPv6 CPN do not obtain IPv6 addresses from a network device such as a DHCPv6 server of the operator but form an IPv6 address list based on a stateless address auto-configuration mechanism or by interacting with a device, such as a Residential Gateway, using the local DHCPv6 server. Hence, the AN cannot obtain the IPv6 address list currently used by the User Terminals in the current CPN, let alone check validity of packets by checking whether the source IPv6 address in each packet is a currently used IPv6 address, just as it does in the IPv4 network.

SUMMARY OF THE INVENTION

Therefore, the present invention is proposed to solve the above technical problems that exist during implementing network security control, such as EP address anti-spoofing, in the IPv6 access network. Based on the present invention, valid network prefixes are saved in the access node device in the IPv6 access network, a network prefix in a source IPv6 address of a packet from the CPN is checked, and if it is found that the network prefix in the source IPv6 address of the packet belongs to the saved valid network prefixes, the access node device then forwards the packet. Since only the network prefix portion in IPv6 addresses is subjected to a check, a small quantity of valid network prefix information is saved in the access node device, which avoids a large storage space required for directly saving a large amount of valid IPv6 addresses. Preferably, the access node device can automatically obtain those valid network prefixes corresponding to the CPN by snooping network prefix allocation messages sent to the Residential Gateway.

According to a first aspect of the present invention, there is provided a method for forwarding a packet from a Residential Gateway in an access node device in an IPv6 access network. The access node device first receives a packet from the Residential Gateway, then obtains a network prefix in a source IPv6 address of the packet, judges whether the network prefix in the source IPv6 address of the packet is a valid network prefix of a CPN corresponding to the Residential Gateway, and if yes, forwards the packet finally.

According to a second aspect of the present invention, there is provided an apparatus for forwarding a packet from a Residential Gateway in an access node device in an IPv6 access network. The apparatus comprises a receiving unit for receiving a packet from the Residential Gateway, an obtaining unit for obtaining a network prefix in a source IPv6 address of the packet, a judgment unit for judging whether the network prefix in the source IPv6 address of the packet is a valid network prefix of a CPN corresponding to the Residential Gateway, and a forwarding unit for forwarding the packet finally.

BRIEF DESCRIPTION OF THE DRAWINGS

Other objects, features, and advantages of the present invention will become more apparent from the description of the non-limiting embodiments, when taken in conjunction with the figures wherein.

Like or similar reference numerals denote the same or similar step features or devices (modules) throughout the figures.

DETAILED DESCRIPTION OF THE PREFERRED EMBODIMENT

Figure 1:
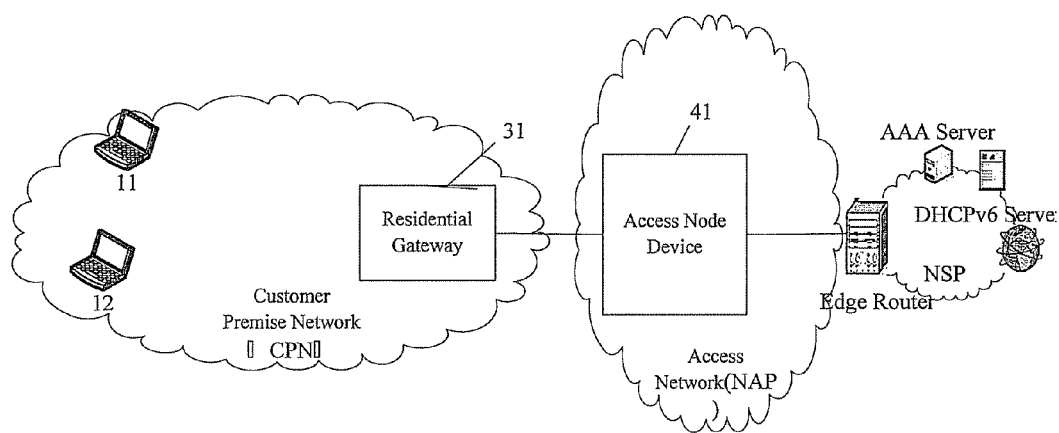
FIG. 1 illustrates a schematic topological structural view of an IPv6 access network according to a specific embodiment of the present invention.

In a schematic topological layout view of an IPv6 access network according to a specific embodiment of the present invention as illustrated in FIG. 1, a Network Access Provider (NAP) is connected via an access node device with one or more Residential Gateways (RGWs) 31. Each RGW 31 is connected with a Customer Premises Network (CPN). User Terminals 1$n$ ($n$ is a natural number equaling 1, 2, . . . ) is connected with the RGW 31 to obtain a network prefix or an IPv6 address from the RGW 31 and send a packet that contains the IPv6 address of the User Terminal as a source IP address, to the NAP via the RGW 31. The NAP is connected with a network of one or more Network Service Providers (NSPs) via a network device such as an edge router, wherein the network device includes a Dynamic Host Configuration Protocol (DHCPv6) server, an Authentication, Authorization and Accounting (AAA) server, etc.

Figure 2:
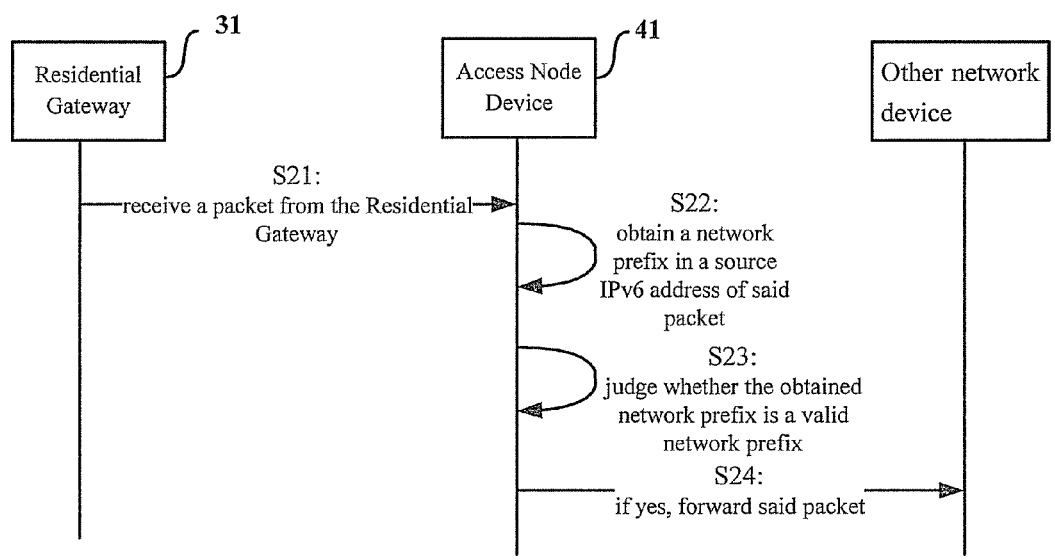
FIG. 2 illustrates a message flow view of a method for forwarding a packet in an access node device in an IPv6 access network according to a specific embodiment of the present invention.

FIG. 2 illustrates a message flow view of a method for forwarding a packet in an access node device in an IPv6 access network according to a specific embodiment of the present invention. Hereinafter, the specific embodiment of the present invention as illustrated in FIG. 2 will be explained in detail in conjunction with FIG. 1.

First of all, an access node device 41 receives a packet from the RGW 31 in step S21. The packet contains a source IPv6 address.

Optionally, varieties of communication techniques may be used for packet transmission between the access node device 41 and the Residential Gateway 31, such as the Digital Subscriber Line (DSL) technique, an optical fiber connection, a cable connection, or wireless transmission techniques including IEEE 802.16.

Next, the access node device 41 obtains a network prefix in the corresponding source IPv6 address from the received packet in step S22.

Then, in step S23, the access node device 41 judges whether the network prefix in the source IPv6 address of the packet is a valid network prefix of the CPN corresponding to the RGW 31. In the IPv6 network, IPv6 addresses used by all User Terminals within a CPN typically belong to one or more address spaces. That is, usually the same CPN is allocated one or more IPv6 address spaces, i.e., correspond to one or more network prefixes.

Optionally, these network prefixes may be allocated to the CPN by a network prefix allocation server (e.g., a DHCPv6 server), or they may be configured or specified by other configuration servers during network deployment in advance. During actual implementation of the present invention, after the CPN obtains the above valid network prefixes, these valid network prefixes may be reported by the RGW 31 to the access node device 41 connected with the RGW 31, or the access node device 41 may obtain these valid network prefixes by snooping a relevant message sent by the network prefix allocation server or the configuration server to the ROW.

Hence, when the access node device 41 obtains the valid network prefixes of the CPN corresponding to the RGW 31, it is possible to check whether the network prefix in the source IPv6 address of the packet sent via the RGW 31 from the User Terminal within the CPN is one of these valid network prefixes.

Preferably, the access node network 41 prestores the valid network prefixes corresponding to the CPN in the form of a set, i.e., the access node network 41 prestores a valid network prefix set for the CPN. In this manner, it is simply to judge in step S23 whether the network prefix in the source IPv6 address obtained from the packet belongs to the valid network prefix set prestored for the CPN by the access node device 41.

More preferably, for each set element or part of set elements of the valid network prefix set saved for the CPN by the access node device 41, i.e., for each valid network prefix or part of valid network prefixes, valid lifetime information is saved to indicate during which time period the IPv6 address space represented by the valid network prefix is used by the corresponding CPN. Generally valid lifetime information of a valid network prefix may be expressed in the following forms:

1) Specifying a Start Time and a Length of Time

For example, if the start time of valid lifetime information of the valid network prefix 3FFE:FFFF:0:C000::/54 is 20:00 on Aug. 8, 2008 and the length of time is 2000 seconds, it indicates that the valid network prefix is valid within 2000 seconds starting from 20:00 on Aug. 8, 2008, i.e., the User Terminal within the CPN may use the IPv6 address in the address space represented by the valid network prefix to send packets. At this point, the valid network prefix in the valid network prefix set may be expressed as (3FFE:FFFF:0:C000::/54, 20:00 on Aug. 8, 2008, 2000 seconds). Table 1 shows a set of valid network prefixes having valid lifetime information expressed in the above form, wherein the set comprises three valid network prefixes and respective valid lifetime information.

TABLE 1

| Serial Number | Network Prefix | Start Time | Length of Time |
|---|---|---|---|
| valid network prefix 1 | 3FFE:FFFF:0:C000::/54 | 20:00 on August 8, 2008 | 2000 seconds |
| valid network prefix 2 | 3FFE:EEEE:0:C000::/54 | 20:00 on July 8, 2008 | 200000 seconds |
| valid network prefix 3 | 3FFE:DDDD:0:C000::/54 | 20:00 on June 8, 2008 | 300000 seconds |

2) Specifying a Deadline

For example, if the deadline of valid lifetime information of the valid network prefix 3FFE:FFFF:0:C000::/54 is 20:00 on Aug. 24, 2008, it indicates that this valid network prefix is valid by 20:00 on Aug. 24, 2008, i.e., the User Terminal within the CPN may use the IPv6 address in the address space represented by the valid network prefix to send packets. At this point, the valid network prefix in the valid network prefix set may be expressed as (3FFE:FFFF:0:C000::/54, 20:00 on Aug. 24, 2008). Table 2 shows a set of valid network prefixes having valid lifetime information expressed in the above form, wherein the set comprises two valid network prefixes and respective valid lifetime information.

TABLE 2

| Serial Number | Network Prefix | Deadline |
|---|---|---|
| valid network prefix 1 | 3FFE:FFFF:0:C000::/54 | 20:00 on August 24, 2008 |
| valid network prefix 2 | 3FFE:EEEE:0:C000::/54 | 20:00 on August 24, 2008 |

As a preferred embodiment of the present invention, in the case that the valid network prefix set saved for the CPN by the access node device 41 further saves valid lifetime information of each prefix network prefix, the access node device 41 further judges whether each valid network prefix in the valid network prefix set has expired, according to valid lifetime information corresponding to each valid network prefix; if a certain valid network prefix has expired, the access node device 41 then deletes it from the valid network prefix set. For example, a valid network prefix in the valid network prefix set as shown in Table 2 is (3FFE:EEEE:0:C000::/54, 20:00 on Aug. 24, 2008). If the current system time is 20:05 on Aug. 24, 2008, it means that this valid network prefix has expired, i.e., the User Terminal within the CPN should not use the IPv6 address in the address space represented by this valid network prefix to send packets any more. At this point, the access node device 41 then deletes the valid network prefix (3FFE:EEEE:0:C000::/54, 20:00 on Aug. 24, 2008) from the valid network prefix set. Accordingly, after this valid network prefix is deleted, the valid network prefix set in Table 2 may be as shown in Table 3.

TABLE 3

| Serial Number | Network Prefix | Deadline |
| --- | --- | --- |
| valid network prefix 1 | 3FFE:EEEE:0:C000::/54 | 20:00 on September 8, 2008 |

Optionally, during actual implementation of the present invention, whether a valid network prefix has expired may be judged by periodically scanning each valid network prefix in the valid network prefix set and based on the corresponding valid lifetime information and the current system time; if a certain valid network prefix has expired, it is deleted from the valid network prefix set. Preferably, a corresponding timer may be initiated according to valid lifetime information corresponding to a valid network prefix; in the case of a timer timeout event, the corresponding valid network prefix is deleted from the valid network prefix set.

If a certain valid network prefix in the valid network prefix set has no corresponding valid lifetime information being saved, it is then believed that this valid network prefix is allocated to the CPN corresponding to the RGW 31 for use all along, i.e., this valid network prefix will not expire as time elapses.

Preferably, the RGW 31 corresponding to the CPN requests a valid network prefix of the CPN from the network prefix allocation server (e.g., the DHCPv6 server or other AAA server). Hence, the network prefix allocation server usually sends a network prefix allocation reply message to the RGW 31. According to the topological structure of an IPv6 access network as illustrated in FIG. 1, these network prefix allocation reply messages must pass through the access node device 41 before reaching the RGW 31, so that the access node device 41 can conveniently, duly and efficiently snoop these network prefix allocation reply messages, obtain valid network prefixes allocated to the CPN and add them to a valid network prefix set saved for this CPN (at this point, if the access node device 41 contains no corresponding valid network prefix set, it first creates an empty valid network prefix set before performing the adding operation). When the access node device 41 obtains, from the snooped network prefix allocation reply message, a valid network prefix allocated to the CPN along with valid lifetime information corresponding to the valid network prefix, then the access node device 41 adds the valid network prefix and its corresponding lifetime information to the valid network prefix set. For example, if the allocated valid network prefix is 3FFE:FFFF:0:C000::/54 and valid lifetime information represented by a deadline is 20:00 on Aug. 24, 2008, then (3FFE:FFFF:0:C000::/54, 20:00 on Aug. 24, 2008) may be jointly added to the valid network prefix set of the CPN corresponding to the RGW 31. Specifically, 1) if the valid network prefix set already contains a valid network prefix (3FFE:FFFF:0:C000::/54, 20:00 on Aug. 21, 2008), then the valid lifetime information 20:00 on Aug. 21, 2008 corresponding to the valid network prefix is updated as 20:00 on Aug. 24, 2008, or (3FFE:FFFF:0:C000::/54, 20:00 on Aug. 21, 2008) are deleted from the valid network prefix set and then (3FFE:FFFF:0:C000::/54, 20:00 on Aug. 24, 2008) are added to the set.

2) if the valid network prefix set already contains a valid network prefix 3FFE:FFFF:0:C000::/54 without corresponding valid lifetime information, then 20:00 on Aug. 24, 2008 is used as valid lifetime information of the valid network prefix, i.e., the updated valid network prefix set includes the member (3FFE:FFFF:0:C000::/54, 20:00 on Aug. 24, 2008);

3) in other cases, i.e., if the valid network prefix set does not contain the network prefix 3FFE:FFFF:0:C000::/54, (3FFE:FFFF:0:C000::/54, 20:00 on Aug. 24, 2008) are then added to the valid network prefix set as a new member.

Preferably, the above-mentioned network prefix allocation server comprises a DHCPv6 server or a Delegating Router, and the network prefix reply message sent to the RGW 31 comprises a DHCP Reply message for Prefix Delegation or a DHCP Reconfigure message for Prefix Delegation.

Preferably, during actual implementation of the present invention, the access node device 41 is usually connected with a plurality of different Residential Gateways. At this point, in order to easily differentiate a Residential Gateway to which the snooped DHCP Reply message or DHCP Reconfigure message will be sent, the access node device 41 further comprises the following steps:

First, the access node device 41 inserts a logical identifier, which is used by a local access device for identifying a Residential Gateway, into an upstream DHCP message (in the present application document, a DHCP message which is sent by the RGW 31 via the access node device 41 to the DHCPV6 server is referred to as an "upstream DHCP message" and a DHCP message which is sent by the DHCPv6 server via the access node device 41 to the RGW 31 is referred to as a "downstream DHCP message") received from the Residential Gateway and then forwards the upstream DHCP message;

Second, upon receipt of a downstream DHCP message from the DHCPv6 server or the Delegating Router, the access node device 41 judges, according to the logical identifier used by the local access node device for identifying the Residential Gateway as contained therein, whether the downstream DHCP message is sent to the Residential Gateway corresponding to the contained logical identifier, and forwards the downstream DHCP message to the Residential Gateway. Different logical identifiers correspond to different Residential Gateways with which the access node device 41 is connected.

Specifically, the upstream DHCP message comprises a DHCP Solicit message, a DHCP Request message, a DHCP Renew message, a DHCP Rebuild message and the like in the DHCPv6 protocol; the downstream message comprises a DHCP Advertise message for Prefix Delegation, a DHCP Reply message for Prefix Delegation, and a DHCP Reconfigure message for Prefix Delegation.

Preferably, if the access node device 41 and the RGW 31 are connected via a Digital Subscriber Line, the access node device 41 typically uses a unique DSL line number to represent this Digital Subscriber Line. At this point, the DSL line number may be selected as a logical identifier used for identifying the Residential Gateway by the local access node device during actual implementation of the present invention.

Lastly, if the access node device 41 determines in step S23 that the network prefix in the source IP address of the packet is one of valid network prefixes of the CPN or belongs to the valid network prefix set of the CPN, then the access node device 41 forwards the packet in step S24.

It should be noted that the above-described updates on the valid network prefix set, such as deletion and addition, may be implemented while the access node device checks and forwards the network prefix in the source IPv6 address of the packet. That is, there is no strict requirement on the time sequence between the updates on the valid network prefix set, such as deletion and addition, and steps S21-S23.

Figure 3:
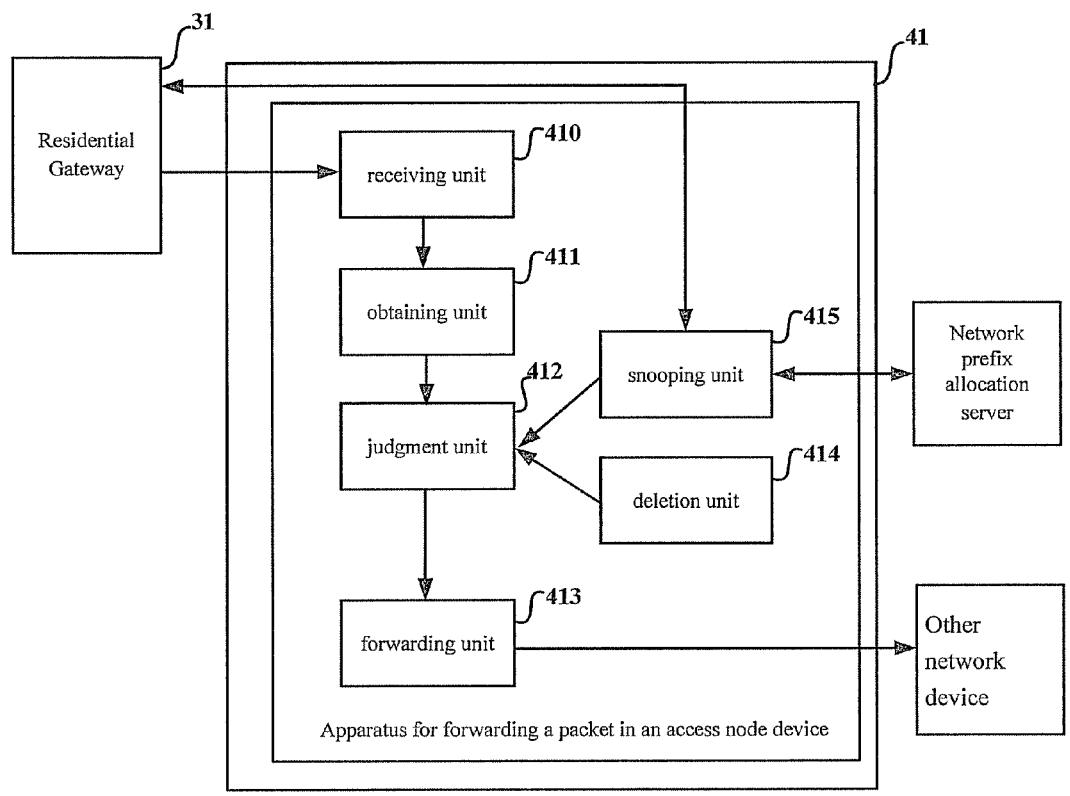
FIG. 3 illustrates a block diagram of an apparatus for forwarding a packet in an access node device in an IPv6 access network according to another specific embodiment of the present invention.

FIG. 3 illustrates a block diagram of an apparatus for forwarding a packet in an access node device in an IPv6 network according to another specific embodiment of the present invention. Hereinafter, the specific embodiment of the present invention as illustrated in FIG. 3 will be explained in detail in conjunction with FIG. 1.

In the access node device 41, the apparatus for forwarding a packet comprises a receiving unit 410, an obtaining unit 411, a judgment unit 412, a forwarding unit 413, a deletion unit 414, and a snooping unit 415. For the purpose of conciseness, the apparatus for forwarding a packet comprises many sub-means contained in the preferred embodiments. Under the teaching of the present application, those skilled in the art would appreciate that only the receiving unit 410, the obtaining unit 411, the judgment unit 412, and the forwarding unit 413 are essential to implementation of the present invention and that other means may be optical means.

First of all, the access node device 41 receives a packet from the RGW 31 by means of the receiving unit 410, wherein the packet comprises a source IPv6 address.

Next, the access node device 41 obtains a network prefix in the corresponding source IPv6 address from the received packet by means of the obtaining unit 411.

Then, the access node device 41 judges, by means of the judging unit 412, whether the network prefix in the source IPv6 address of the packet is one of valid network prefixes of the CPN corresponding to the RGW 31. The judgment unit 412 saves all valid network prefixes of the CPN corresponding to the RGW 31, i.e., network prefixes allocated to the CPN. In other words, the User Terminals within the CPN may use IPv6 addresses of IPv6 spaces represented by these network prefixes to send packets.

Preferably, the judgment unit 412 prestores valid network prefixes corresponding to CPN in the form of a set, i.e., prestores a valid network prefix set of the CPN. In this way, it is possible for the judgment unit 412 to simply judge whether the network prefix in the source IPv6 address obtained from the packet belongs to the prestored valid network prefix set of the CPN.

More preferably, for each set element or part of set elements of the valid network prefix set of the CPN as saved by the judgment unit 412, i.e., for each valid network prefix or part of valid network prefixes, valid lifetime information is saved to indicate during which time period the IPv6 address space represented by the valid network prefix is used by the corresponding CPN. At this point, the deletion unit 414 judges whether each valid network prefix in the valid network prefix set has expired, according to valid lifetime information corresponding to each valid network prefix; if a certain valid network prefix has expired, the deletion unit 414 then deletes it from the valid network prefix set.

Optionally, during actual implementation of the deletion unit 414, whether a valid network prefix has expired may be judged by periodically scanning each valid network prefix in the valid network prefix set and based on the corresponding valid lifetime information and the current system time; if a certain valid network prefix has expired, it is deleted from the valid network prefix set. Preferably, a corresponding timer may be initiated according to valid lifetime information corresponding to a valid network prefix; in the case of a timer timeout event, the deletion unit 414 deletes the corresponding valid network prefix from the valid network prefix set.

Preferably, the RGW 31 corresponding to the CPN requests a valid network prefix of the CPN from the network prefix allocation server (e.g., the DHCPv6 server or other AAA server). Hence, the network prefix allocation server usually sends a network prefix allocation reply message to the RGW 31. At this point, the snooping unit 415 may conveniently, duly and efficiently snoop these network prefix allocation reply messages, obtain valid network prefixes allocated to the CPN and add them to a valid network prefix set corresponding to the CPN as saved by the judgment unit 413 (at this point, if the judgment unit 413 contains no corresponding valid network prefix set, it first creates an empty valid network prefix set before performing the adding operation).

When a network prefix allocation reply message contains both a valid network prefix allocated to the CPN and the corresponding valid lifetime information, the snooping unit 415 then obtains the valid network prefix allocated to the CPN along with the corresponding valid lifetime information by snooping the network prefix allocation reply message, and adds the valid network prefix and its corresponding valid lifetime information to the valid network prefix set saved by the judgment unit 413.

Similarly, the snooping unit 415 may perform an adding operation to the valid network prefix set corresponding to the CPN as saved by the judgment unit 413 by using the method described above.

Preferably, the snooping unit 415 obtains the valid network prefix allocated to the CPN and the corresponding valid lifetime information by snooping a DHCP Reply message for Prefix Delegation or a DHCP Reconfigure message for Prefix Delegation which is sent by the DHCPv6 server or the Delegating Router to the RGW 31.

Preferably, during actual implementation of the present invention, the access node device 41 is usually connected with a plurality of different Residential Gateways. At this point, in order to easily differentiate a Residential Gateway to which the snooped DHCP Reply message or DHCP Reconfigure message will be sent, the snooping unit 415 is further for the following use:

First, the snooping unit 415 inserts a logical identifier, which is used by a local access device for identifying a Residential Gateway, into an upstream DHCP message received from the Residential Gateway and then forwards the upstream DHCP message;

Second, upon receipt of a downstream DHCP message from the DHCPv6 server or the Delegating Router, the snooping unit 415 judges, according to the logical identifier used by the local access node device for identifying the Residential Gateway as contained therein, whether the downstream DHCP message is sent to the Residential Gateway corresponding to the contained logical identifier, and forwards the downstream DHCP message to the Residential Gateway.

Specifically, the upstream DHCP message comprises a DHCP Solicit message, a DHCP Request message, a DHCP Renew message, a DHCP Rebuild message and the like in the DHCPv6 protocol; the downstream message comprises a DHCP Advertise message for Prefix Delegation, a DHCP Reply message for Prefix Delegation, and a DHCP Reconfigure message for Prefix Delegation.

Preferably, if the access node device 41 and the RGW 31 are connected via a Digital Subscriber Line, the access node device 41 typically uses a unique DSL line number to represent this Digital Subscriber Line. At this point, the DSL line number may be selected as a logical identifier used for identifying the Residential Gateway by the local access node device during actual implementation of the present invention.

Lastly, if the judgment unit 413 determines that the network prefix in the source IP address of the packet is one of valid network prefixes of the CPN or belongs to the valid network prefix set of the CPN as prestored by the access node device 41, then the packet is forwarded by means of the forwarding unit 414.

Figure 4:
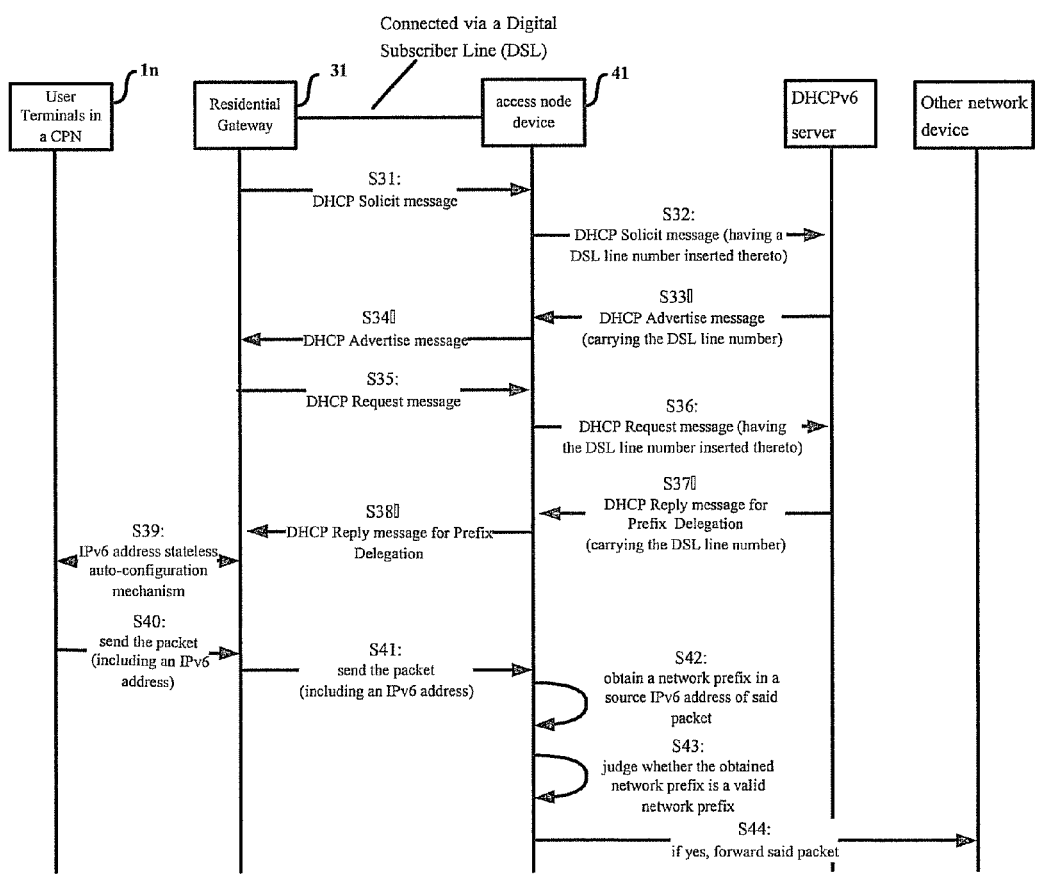
FIG. 4 illustrates a message flow view of a method for forwarding a packet in an access node device in an IPv6 access network according to another specific embodiment of the present invention.

FIG. 4 illustrates a message flow view of a method for forwarding a packet in an access node device in an IPv6 network according to another specific embodiment of the present invention. Hereinafter, the specific embodiment of the present invention as illustrated in FIG. 4 will be explained in detail in conjunction with FIGS. 1, 5a, and 5b.

In the IPv6 access network according to this embodiment, the access node device 41 is connected with different Residential Gateways via different Digital Subscriber Lines; in the access node device 41, different Digital Subscriber Lines are uniquely represented by different DSL line numbers (DSL line No.) and are connected with different Residential Gateways. In the meanwhile, the RGW 31 corresponds to a CPN where the User Terminals send packets to the access node device 41 via the Residential Gateway.

After being connected with the access node device 41, the RGW 31 first sends a DHCP Solicit message to the DHCPv6 server in step S31, requesting the DHCPv6 server to allocate it a corresponding network prefix. The DHCP Solicit message contains IA_PD-option information as illustrated in FIG. 5a.

Upon receipt of the DHCP Solicit message sent by the RGW 31, the access node device 41 adds the DSL line number of the Digital Subscriber Line, which connects the access node device 41 with the RGW 31, to the DHCP Solicit message by means of the Relay Agent Subscriber ID option defined in the DHCPv6 protocol and subsequently forwards the DHCP Solicit message to the DHCPv6 server, in step S32. It should be noted that this DSL line number may be replaced by a logical identifier used for differentiating a Residential Gateway by the access node device 41, wherein the access node device 41 differentiates different Residential Gateways, which are connected therewith, according to different logical identifiers. For example, optionally, when the access node device 41 uses different serial numbers to uniquely denote different Residential Gateways connected therewith, the above DSL line number may be replaced by a serial number denoting the RGW 31.

Upon receipt of a DHCP Advertise message sent by the DHCPv6 server, the access node device 41 removes the contained DSL line number from the message in step S33 and forwards the DHCP Advertise message, which no longer contains the DSL line number, to the Residential Gateway corresponding to the DSL line number in step S34.

Figure 5A:
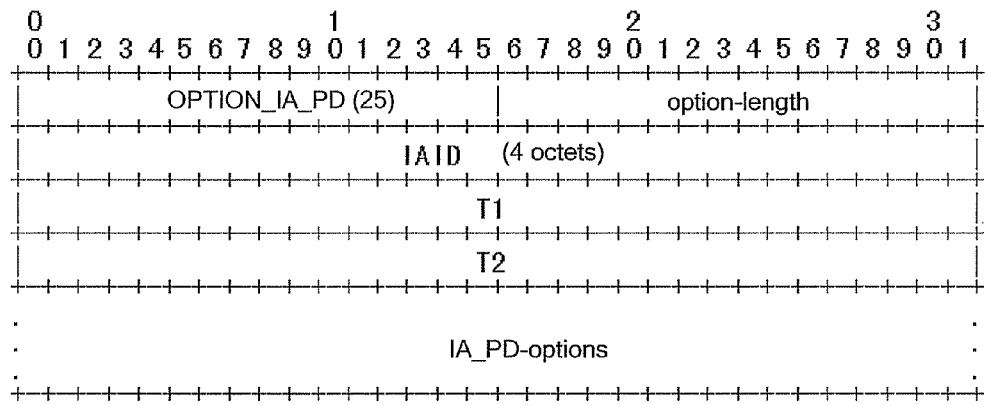
FIG. 5a illustrates a schematic structural view of IA_PD options in the DHCPv6 protocol.
Figure 5B:
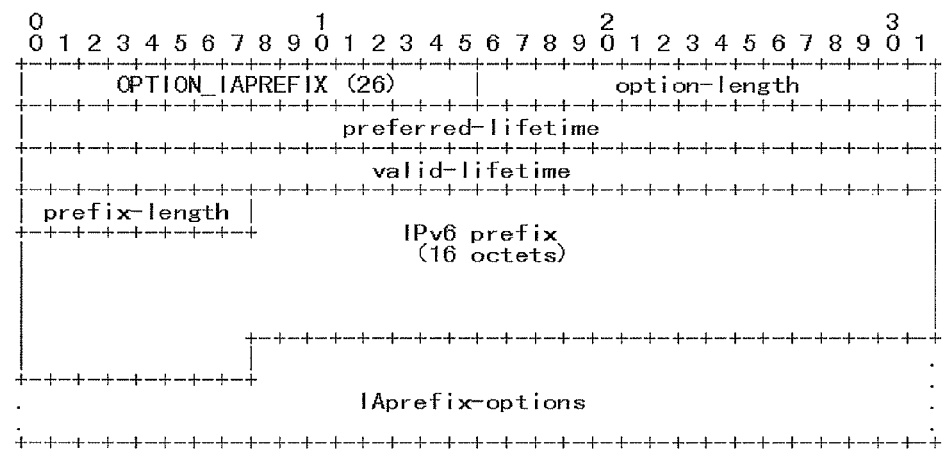
FIG. 5b illustrates a schematic structural view of Iaprefix-options in the DHCPv6 protocol.

Similarly, the access node device 41 receives a DHCP Request message sent by the RGW 31 in step S35, wherein the DHCP Request message contains IA_PD-option as illustrated in FIG. 5a, and the IA_PD option contains Iaprefix-option infatuation as illustrated in FIG. 5b. Subsequently, the access node device 41 adds the DSL line number of the Digital Subscriber Line, which connects the access node device 41 with the RGW 31, to the DHCP Request message by means of the Relay Agent Subscriber ID option defined in the DHCPv6 protocol and forwards the DHCP Request message to the DHCPv6 server, in step S36.

Upon receipt of a DHCP Reply message for Delegation sent by the DHCPv6 server, the access node device 41 removes the contained DSL line number from the message in step S37 and forwards the DHCP Reply message for Delegation, which no longer contains the DSL line number, to the Residential Gateway 31 corresponding to the DSL line number in step S38. The DHCP Reply message for Delegation contains the Iaprefix-option information as illustrated in FIG. 5b, an IPv6 prefix contained in the Iaprefix-option is a network prefix allocated to the RGW 31 by the DHCPv6 server, and corresponding valid lifetime information represented by the network prefix is that the time when the RGW 31 receives the DHCP Reply message for Delegation is a start time and the valid-lifetime contained in the Iaprefix-option is a length of time.

With steps S31 to S38, the access node device 41 can obtain the valid network prefix allocated to the RGW 31 by the DHCPv6 server and the corresponding valid lifetime information from the snooped DHCP Reply message for Delegation. For example, if the access node device 41 receives a DHCP Reply message for Delegation sent by the DHCPv6 server to the RGW 31, at 20:00 on Sep. 9, 2008, wherein the contained IPv6 prefix is 3FFE:FFFF:0:C000::/54, the contained valid-lifetime is 2000 seconds, and the access node device 41 saves no valid network prefix set for a CPN corresponding to the RGW 31, then the access node device 41 will create a list as shown in Table 4 to save the valid network prefix 3FFE:FFFF:0:C000::/54 allocated to the CPN and the corresponding valid lifetime information.

TABLE 4

| Serial Number | Network Prefix | Start Time | Length of Time |
|---|---|---|---|
| network prefix 1 | 3FFE:FFFF:0:C000::/54 | 20:00 on September 9, 2008 | 2000 seconds |

Afterwards in step S39, a User terminal within the CPN obtains the valid network prefix information from the RGW 31 by means of the IPv6 address stateless auto-configuration mechanism and forms an available IPv6 address using the valid network prefix information in conjunction with its own device information. In step S40, the User Terminal sends a packet to the RGW 31 by using the newly formed IPv6 address as a source IP address of the packet. The RGW 31 then forwards the packet to the access node device 41 in step S41. For example, if a network prefix allocated to the RGW 31 is 3FFE:FFFF:0:C000::/54, a possible IPv6 address formed by the User Terminal is 3FFE:FFFF:0:C000:1111:2222:AAAA:BBBB. Then, the access node device 41 obtains in step S42 the network prefix 3FFE:FFFF:0:C000::/54 from the source IPv6 address of the packet from the User Terminal as forwarded by the RGW 31, compares in step S43 this network prefix with the valid network prefix set of the CPN corresponding to the RGW 31 as shown in Table 4 to determine whether the network prefix belongs to the valid network prefix set as shown in Table 4, and finally forwards the packet to the NSP network or other device within the access network in step S44.

The specific embodiments of the present invention have been described above. It is to be understood that the present invention is not limited to the foregoing specific embodiment, and that those of ordinary skill in the art may make various variations or modifications within the scope of the appended claims. The technical solution of the present invention may be implemented in software or hardware.

What is claimed is:

1. A method for forwarding a packet from a Residential Gateway in an access node device in an IPv6 access network, comprising:
   obtaining a first network prefix allocated to said Residential Gateway by a network prefix allocation server;
   adding the first network prefix to a valid network prefix set prestored for a Customer Premises network corresponding to said Residential Gateway;
   receiving a packet from said Residential Gateway;
   obtaining a second network prefix in a source IPv6 address of said packet;
   judging whether the second network prefix in the source IPv6 address of said packet belongs to the valid network prefix set; and forwarding said packet upon the second network prefix belonging to the valid network prefix set.

2. The method according to claim 1, wherein the valid network prefix set prestored for said Customer Premises Network by the access node device comprises one or more valid network prefixes and corresponding valid lifetime information, and wherein the method further comprises:
 judging whether the one or more valid network prefixes have expired according to valid lifetime information corresponding to each valid network prefix in said valid network prefix set, and
 deleting the one or more valid network prefixes and corresponding valid lifetime information from said valid network prefix set upon the expiration of the one or more valid network prefixes.

3. The method according to claim 1, wherein the obtaining of the first network prefix allocated to said Residential Gateway includes snooping a network prefix allocation reply message sent to said Residential Gateway by the network prefix allocation server.

4. The method according to claim 3, wherein the obtaining further includes:
 snooping the network prefix allocation reply message sent to said Residential Gateway by the network prefix allocation server for a valid lifetime information corresponding to the first network prefix,
 adding the corresponding valid lifetime information to the valid network prefix set prestored for said Customer Premises Network by the access node device; and
 replacing valid lifetime information corresponding to the first network prefix with the obtained valid lifetime information if the first network prefix allocated to said Customer Premises Network is already contained in said valid network prefix set.

5. The method according to claim 3, wherein the network prefix allocation server comprises a DHCPv6 server or a Delegating Router, and
 said network prefix allocation reply message comprises a DHCP Reply message for Prefix Delegation or a DHCP Reconfigure message for Prefix Delegation.

6. The method according to claim 5, further comprising:
 receiving an upstream DHCP message from said Residential Gateway, inserting into the upstream DHCP message a logical identifier used for identifying said Residential Gateway by the access node device, and forwarding said upstream DHCP message;
 receiving a downstream DHCP message from said DHCPv6 server or Delegating Router, and forwarding the downstream DHCP message to the corresponding Residential Gateway according to the contained logical identifier used for identifying said Residential Gateway by the access node device.

7. The method according to claim 6, wherein said upstream DHCP message comprises a DHCP Solicit message, a DHCP Request message, a DHCP Renew message, and a DHCP Rebuild message, and
 said downstream DHCP message comprises a DHCP Advertise message for Prefix Delegation, a DHCP Reply message for Prefix Delegation, and a DHCP Reconfigure message for Prefix Delegation.

8. The method according to claim 6, wherein said access node device and said Residential Gateway are connected via a Digital Subscriber Line, and
 the logical identifier used for identifying said Residential Gateway by the access node device comprises a line number of said Digital Subscriber Line.

9. An apparatus for forwarding a packet from a Residential Gateway in an access node device in an IPv6 access network, comprising:
 an obtaining unit configured to obtain a first network prefix allocated to said Residential Gateway by a network prefix allocation server;
 an adding unit configured to add the first network prefix to a valid network prefix set prestored for a Customer Premises network corresponding to said Residential Gateway;
 a receiving unit configured to receive a packet from said Residential Gateway;
 the obtaining unit further configured to obtain a second network prefix in a source IPv6 address of said packet;
 a judgment unit configured to judge whether the second network prefix in the source IPv6 address of said packet belongs to the valid network prefix of a Customer Premises Network corresponding to said Residential Gateway; and
 a forwarding unit configured to forward said packet upon the second network prefix belonging to the valid network prefix set.

10. The apparatus according to Claim 9, wherein the valid network prefix set prestored for said Customer Premises Network by the access node device comprises one or more valid network prefixes and corresponding valid lifetime information, and wherein the apparatus further comprises:
 a deletion unit configured to,
  judge whether the one or more valid network prefixes have expired according to valid lifetime information corresponding to each valid network prefix in said valid network prefix set, and
  delete the one or more valid network prefixes and corresponding valid lifetime information from said valid network prefix set upon the expiration of the one or more valid network prefixes.

11. The apparatus according to claim 9, further comprising:
 a snooping unit configured to snoop a network prefix allocation reply message sent to said Residential Gateway by the network prefix allocation server, to obtain the first network prefix.

12. The apparatus according to claim 11, wherein said snooping unit is further configured to:
 snoop the network prefix allocation reply message sent to said Residential Gateway by the network prefix allocation server, to obtain a valid lifetime information corresponding to the first network prefix,
 add the corresponding valid lifetime information to the valid network prefix set prestored for said Customer Premises Network by the access node device; and
 replace valid lifetime information corresponding to the first network prefix with the obtained valid lifetime information if the first network prefix allocated to said Customer Premises Network is already contained in said valid network prefix set.

13. The apparatus according to claim 11, wherein the network prefix allocation server comprises a DHCPv6 server or a Delegating Router, and
 said network prefix allocation reply message comprises a DHCP Reply message for Prefix Delegation or a DHCP Reconfigure message for Prefix Delegation.

* * * * *